United States Patent [19]

Sweeney

[11] Patent Number: 4,779,652
[45] Date of Patent: Oct. 25, 1988

[54] UNITARY DOUBLE WALL PIPING SYSTEM

[75] Inventor: John M. Sweeney, Sylmar, Calif.

[73] Assignee: Poly Flow Engineering, Inc., Sylmar, Calif.

[21] Appl. No.: 36,350

[22] Filed: Apr. 9, 1987

[51] Int. Cl.⁴ .............................................. F16L 9/18
[52] U.S. Cl. ................................................. 138/113
[58] Field of Search ................ 73/40.5 R, 40.7, 49.1; 116/67 R, 70, 200, 201, DIG. 7; 138/103, 104, 109, 113, 114, 115, 116, 117, DIG. 7; 285/93, 133.1, 137.2, 149, 179

[56] References Cited

U.S. PATENT DOCUMENTS 2,475,635 7/1949 Parsons ........................... 138/114 X
4,280,535 7/1981 Willis .............................. 138/114 X Primary Examiner—Werner H. Schroeder
Attorney, Agent, or Firm—Louis J. Bachand

[57] ABSTRACT

Piping for transport of hazardous fluids is provided by replacing old-fashioned two pipe sections and a fitting type double wall piping by a unitary, integrally molded body of fusible plastic having inner and outer pipe walls supported by ribs between the walls, the ribs serving to carry the inner wall plastic within the mold, and being foreshortened at the junction of successive piping bodies to permit cross-flow of any liquids between the inner and outer wall from the point of inception to the place of detection.

13 Claims, 1 Drawing Sheet

U.S. Patent  Oct. 25, 1988  4,779,652
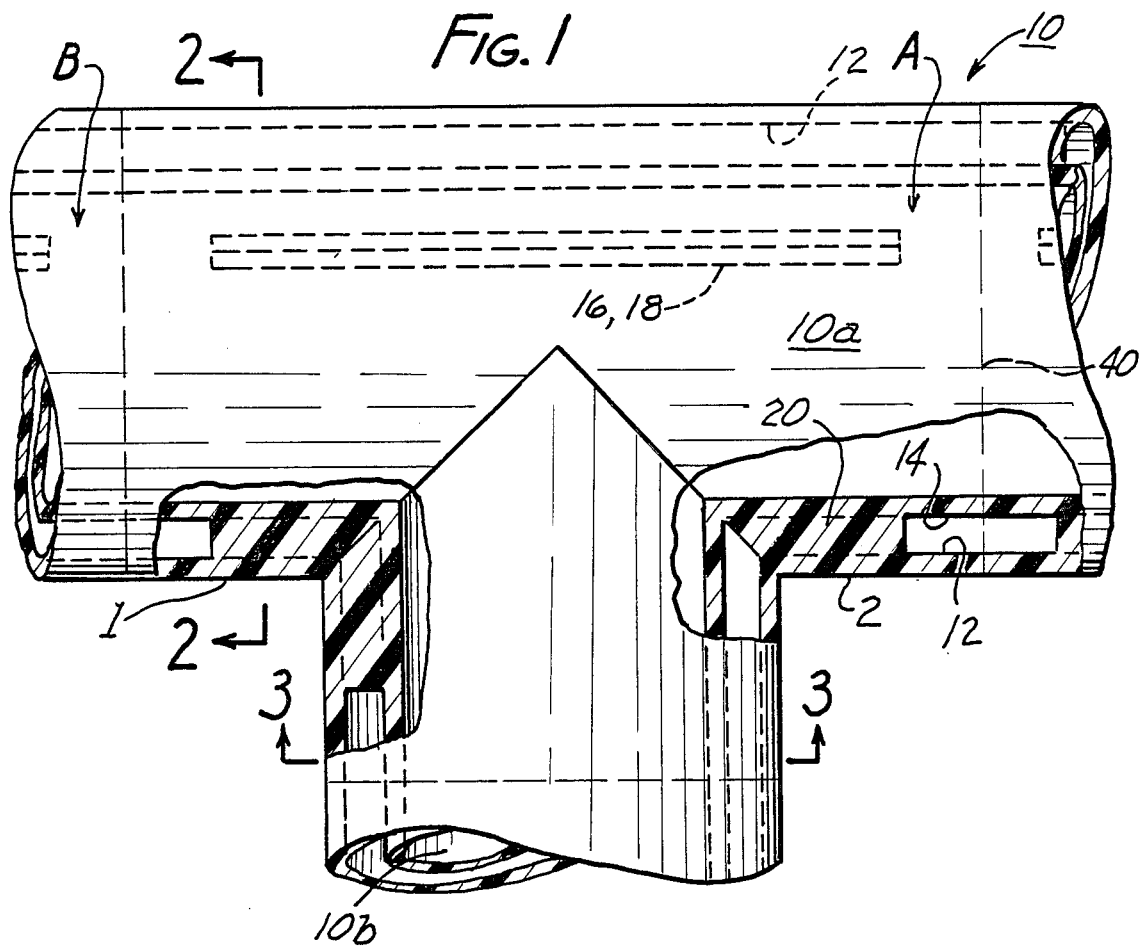
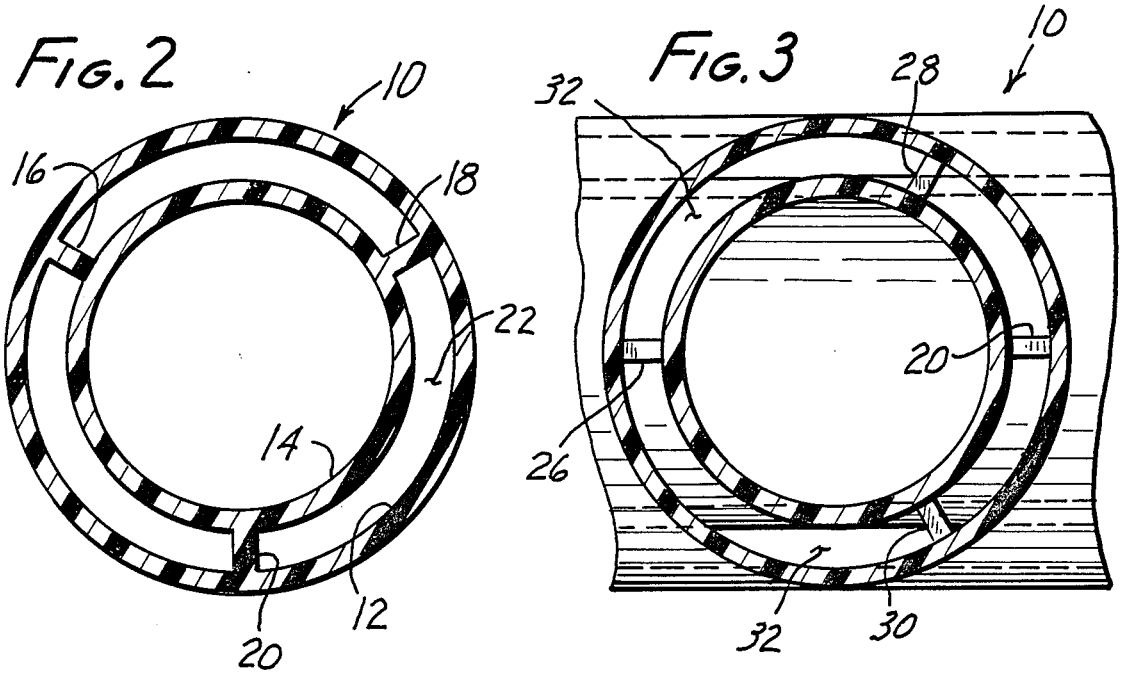

UNITARY DOUBLE WALL PIPING SYSTEM

This invention has to do with piping systems intended for transport of fluids which are dangerous or hazardous to health, or which are critically maintained at a predetermined pressure. More particularly, the invention is concerned with double wall piping systems enabling the containment and monitoring in an outer pipe of pressure drops, leaks and spills from an inner pipe. The invention is specifically directed at piping apparatus comprising a series of modular components each characteristically a unitary molding of suitable plastic, having integrally formed double-walls, i.e. inner and outer pipe walls spaced by circumferentially distributed ribs which are constructed and arranged to permit sensing access to all portions of the chamber defined between the inner and outer pipe walls.

The invention modules are fusible at their ends to permit butt-sealing of successive sections into extensive systems of virtually any configuration. Because fittings at each section junction are eliminated, unduly multiplied seal sites are avoided, in comparison with non-unitary, non-integrally formed, separate inner and outer pipe walls supported in spaced relation by the fittings.

BACKGROUND

The following patents have been considered in the preparation of this application: U.S. Pat. No. 2,860,311,
U.S. Pat. No. 3,907,336
U.S. Pat. No. 4,380,168
U.S. Pat. No. 4,420,970
U.K. No. 854,189
U.K. No. 2,023,296
GER. No. 227,590
GER. No. 1,193,000
GER. No. 1,234,163.

In general these patents reveal the need for two-walled or double wall piping in a wide variety of circumstances including the need to contain hazardous chemicals, the need to confine excessive pressures, and the need to maintain a predetermined condition of pressure or atmosphere. In all such needs what is provided is a first pipe wall and a second pipe wall. As shown in the prior art, it is conventional to take a pair of different diameter tubular pipe sections and to support them at their junctions by a fitting. The need to adequately seal the fitting is addressed in a number of these patents. It is indisputable that the use of a fitting multiplies the sealing problems since typically each pipe section is separately sealed to the fitting, this means the inner and outer pipe sections must be separately joined to the fitting, and not uncommonly the design of the fitting is two-piece, necessitating another seal.

SUMMARY OF THE INVENTION

It is accordingly an object of the invention to provide a simple sealing double walled piping system, one which does not rely on fittings but which uses a simple butt-weld of the inner and outer pipe sections to define an interspace chamber therebetween, the sections being integrally formed as a unitary molded plastic body. The occasions for leakage at the joints is thus drastically minimized, since the number of seals is greatly reduced, and as well a more reliable type of seal, one of fusion of like material to like material is utilized. There is also a dramatic increase in speed of installation of complicated systems owing to having fewer parts and simple assembly procedures. These advantages are obtained without sacrifice of the detection capability of the system, since the use of locally interrupted, e.g. foreshortened ribs permits commingling of all portions of the interspace chamber fluid and the consequent detection of any sensible condition from anywhere within the system.

These and other objects of the invention to become apparent hereinafter, are realized in accordance therewith in a piping system comprising modular components having unitary plastic bodies defining inner and outer piping walls and a plurality of circumferentially distributed ribs integrally formed with and supporting the piping walls in spaced relation to enclose a circumferentially divided chamber therebetween which continues from component to component in the series and into which leakage from the inner pipe will be collected, the ribs extending substantially the length of the chamber in locally interrupted relation, whereby the presence of leakage at any division of the chamber can be sensed in any other division of the chamber.

In this and like embodiments the invention contemplates the modular components being formed of heat or solvent fusible synthetic organic plastic such as olefin plastics, including polymers and copolymers of ethlyene. halide substituted ethylenes such as tetrafluoro ethylene, propylene, styrene, acrylic, vinyls, and the like.

Typically, the piping walls are annular and define an annular chamber between them, the ribs are three in number and uniformly circumferentially spaced, ribs are locally interrupted at the junction of successive ones of the components, the ribs are inset relative to the ends of the modular components, and the rib inset is at least sufficient for butt-bonding by heat fusion of successive ones of the modules without softening the ribs.

In the foregoing and like embodiments, the piping walls are annular and define an annular chamber between them, the ribs are three in number and uniformly circumferentially spaced, and the ribs are inset a distance about twice the height of the ribs.

The invention further contemplates a piping system comprising a series of modular components as described.

Additionally, the invention specifically contemplates a piping system module comprising a unitary molded body having in a relatively smaller first cylindrical locus an inner cylindrical pipe wall, in a second relatively larger cylindrical locus an outer clyindrical pipe wall, the first and second locus being free of intersection with each other, and in between the walls in a third cylindrical locus a series of radially disposed ribs supporting the pipe walls in their respective first and second locus, as well as such a module including also angularly disposed to the inner and outer pipe walls a second set of the inner and outer pipe walls and ribs for changing the direction of a fluid within the module.

THE DRAWING

The invention will be further described as to an illustrative embodiment in conjunction with the accompanying drawing in which:

FIG. 1 is a view in elevation of a tee-shaped module, partly broken away to show underlying structure.

FIG. 2 is a view in transverse section of the main body portion of the module, taken on line 2—2 in FIG. 1; and, FIG. 3 is a view like FIG. 2 taken on line 3—3 in FIG. 1 and of the side body portion of the module.

PREFERRED MODES

With reference now to the drawing in detail, a tee form of the present module is shown. In FIG. 1, the unitary body 10 of the module comprises an outer pipe wall 12 integrally formed of suitable fusible plastic with the inner pipe wall 14. Typically the molding sprues are at locations 1 and 2 on the main body portion 10a. The main body portion 10a unitarily incorporates three elongated ribs 16, 18, and 20 spaced uniformly and circumferentially in the interspace chamber 22 defined by the spacing of the inner and outer pipe walls 12 and 14.

At the side body portion 10b additional ribs 26, 28 and 30 are formed in the corresponding interspace chamber 32, which as can be seen forms a continuation of the main body portion interspace chamber 22, but is at right angles thereto for changing the direction of fluid flowing through the inner or outer pipe wall 12, 14.

The ribs 16–20 and 26–30 are locally interrupted, specifically in the form shown foreshortened relative to the length of the body portions 10a, 10b. The purpose of thus interrupting or pretermitting the ribs 16–20 and 26–30 is to provide at the juncture of the module with the next adjacent module a rib-free clearance so that the fluid in the interspace chambers 22, 32 can intermix with the fluids in the next adjacent module and no fluid is trapped in the approximately one-third portion of the interspace chamber 22, 32 defined by any pair of ribs 16–20 and 26–30.

This feature is highly important when the double walled modules are used for leak containment and detection. The leakage from the inner pipe wall 12, or at its seal with the next adjacent module will release into the surrounding chamber 22, 32, and be confined there by the outer wall 14. Monitoring equipment (not shown) which monitors only one of the regions defined by the ribs 16–20 and 26–30 is nonetheless effective in monitoring the state of the entire chamber 22, 32, since the inset of the ribs from the ends of the module pipe walls 12, 14 enables commingling of all fluids as they pass from module to module, e.g. at areas A, B in FIG. 1.

The module bodies 10 are readily connected by briefly heating or solvating the inner and outer wall pipe ends 40, and butting the ends together with the next adjacent module body, which may be a straight section, curved, elbow or another tee section as depicted in the drawing. A jig may be used for ensuring alignement of the ends.

The foregoing objects of the invention are thus met in that there is provided a double wall modular pipe system in which the body is unitary and has integrally formed the inner and outer pipe walls, spaced by and supported by ribs designed to maintain the interspace while allowing free flow commingling of fluids in the interspace by virtue of an inset at the junction of successive ones of the modules.

I claim:

1. For use in a piping, system a modular component usable in series and comprising a unitary plastic body having inner and outer piping walls with respective first and second ends adapted for assembly in series by bodily abutment end to end and a plurality of circumferentially distributed ribs formed integrally with and supporting said piping walls in spaced relation, said ribs being axially elongated without interruption along substantially the length of said body to almost to said end abutments and defining a circumferentially divided chamber between said walls in which leakage from the inner pipe is collectible, said ribs being adapted to continue said chamber from component to component in a series of said components, whereby the presence of leakage at any division of the chamber can be sensed in any other division of the chamber anywhere in a series of said components.

2. Piping system according to claim 1, in which said modular components are formed of heat fusible plastic.

3. Piping system according to claim 1, in which said modular components are formed of solvent fusible plastic.

4. Piping system according to claim 1, in which said piping walls are annular and define an annular chamber between them.

5. Piping system according to claim 1, in which said ribs are three in number and uniformly circumferentially spaced.

6. Piping system according to claim 1, in which said ribs are inset relative to the ends of said component bodies.

7. Piping system according to claim 6, in which said rib inset is at least sufficient for butt-bonding by heat fusion of successive ones of said modules without softening said ribs.

8. Piping system according to claim 7, in which said piping walls are annular and define an annular chamber between them.

9. Piping system according to claim 8, in which said ribs are three in number and uniformly circumferentially spaced.

10. Piping system according to claim 9, in which said ribs are inset a distance about twice the height of said ribs.

11. Piping system comprising a series of modular components according to claim 1 in butt joined relation.

12. Piping system comprising a unitary molded body having in a relatively smaller first cylindrical locus an inner cylindrical pipe wall, in a second relatively larger cylindrical locus an outer cylindrical pipe wall, said first and second loci being free of intersection with each other, and in between said walls in a third cylindrical locus a series of radially disposed ribs uninterrupted other than at the pipe wall ends supporting said pipe walls in their respective first and second loci.

13. Piping system module according to claim 12, including also angularly disposed to said inner and outer pipe walls a second set of said inner and outer pipe walls and ribs for changing the direction of a fluid within said module.

* * * * *